United States Patent
Tsukimoto

(10) Patent No.: US 6,781,283 B2
(45) Date of Patent: Aug. 24, 2004

(54) VIBRATION ELEMENT AND VIBRATION WAVE DRIVING APPARATUS

(75) Inventor: Takayuki Tsukimoto, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 79 days.

(21) Appl. No.: 10/047,108

(22) Filed: Jan. 17, 2002

(65) Prior Publication Data

US 2002/0096971 A1 Jul. 25, 2002

(30) Foreign Application Priority Data

Jan. 22, 2001 (JP) ........................................ 2001-013365
Jan. 11, 2002 (JP) ........................................ 2002-004198

(51) Int. Cl.$^7$ .............................. H02N 2/00; H02N 2/16
(52) U.S. Cl. .................. 310/323.16; 310/317; 310/325;
    310/323.16; 310/323.13; 310/323.02; 310/323.03
(58) Field of Search ...................... 310/323.16, 323.02,
    310/323.12, 317, 325, 323.03

(56) References Cited

U.S. PATENT DOCUMENTS

| | | | |
|---|---|---|---|
| 4,678,956 A | 7/1987 | Izukawa et al. ........ | 310/323.06 |
| 4,692,650 A | 9/1987 | Okumura et al. ...... | 310/323.08 |
| 4,692,651 A | 9/1987 | Hiramatsu et al. ..... | 310/323.09 |
| 4,752,711 A | 6/1988 | Tsukimoto et al. .... | 310/323.11 |
| 4,763,148 A | 8/1988 | Tsukimoto et al. .... | 310/323.03 |
| 4,764,702 A * | 8/1988 | Mishiro .................. | 310/323.12 |
| 4,810,923 A | 3/1989 | Tsukimoto et al. .... | 310/323.07 |
| 4,812,697 A * | 3/1989 | Mishiro .................. | 310/323.12 |
| 5,004,964 A | 4/1991 | Kataoka et al. ............. | 318/128 |
| 5,274,295 A | 12/1993 | Tsukimoto et al. .... | 310/323.15 |
| 5,298,829 A | 3/1994 | Tsukimoto et al. .... | 310/323.04 |
| 5,300,850 A | 4/1994 | Okumura et al. ...... | 310/323.04 |
| 5,359,251 A | 10/1994 | Tsukimoto et al. .... | 310/323.13 |
| 5,387,835 A | 2/1995 | Tsukimoto et al. .... | 310/323.13 |
| 5,436,522 A | 7/1995 | Tsukimoto et al. .... | 310/323.12 |
| 5,585,685 A | 12/1996 | Maeno et al. .......... | 310/323.02 |
| 5,646,469 A | 7/1997 | Tsukimoto et al. .... | 310/323.01 |
| 5,917,270 A | 6/1999 | Tsukimoto et al. .... | 310/323.12 |
| 5,949,178 A | 9/1999 | Tamai et al. ........... | 310/323.01 |
| 5,952,766 A | 9/1999 | Mukohjima et al. ... | 310/323.04 |

FOREIGN PATENT DOCUMENTS

JP          2001-145376          5/2001

* cited by examiner

Primary Examiner—Thomas M. Dougherty
Assistant Examiner—J. Aguirrechea
(74) Attorney, Agent, or Firm—Fitzpatrick, Cella, Harper & Scinto

(57) ABSTRACT

A vibration wave driving apparatus includes an electro-mechanical energy conversion element that is sandwiched and fixed between elastic members, in which a flange-shaped elastic member is provided between the electro-mechanical energy conversion element and one of the elastic members. When a driving vibration is applied to the electro-mechanical energy conversion element, bending vibrations are excited in a vibration element and those bending vibrations allow out-of-plane bending vibrations to be excited in the flange-shaped elastic member. A rotor is brought into contact with the third elastic member sandwiched between the elastic member and the electro-mechanical energy conversion element. A travelling wave produced by the bending vibration of the vibration element and a travelling wave produced by the out-of-plane bending vibration of the third elastic member are generated at the frictional surface of the vibration element.

23 Claims, 8 Drawing Sheets

FIG. 10A
PRIOR ART
FIG. 10B
PRIOR ART
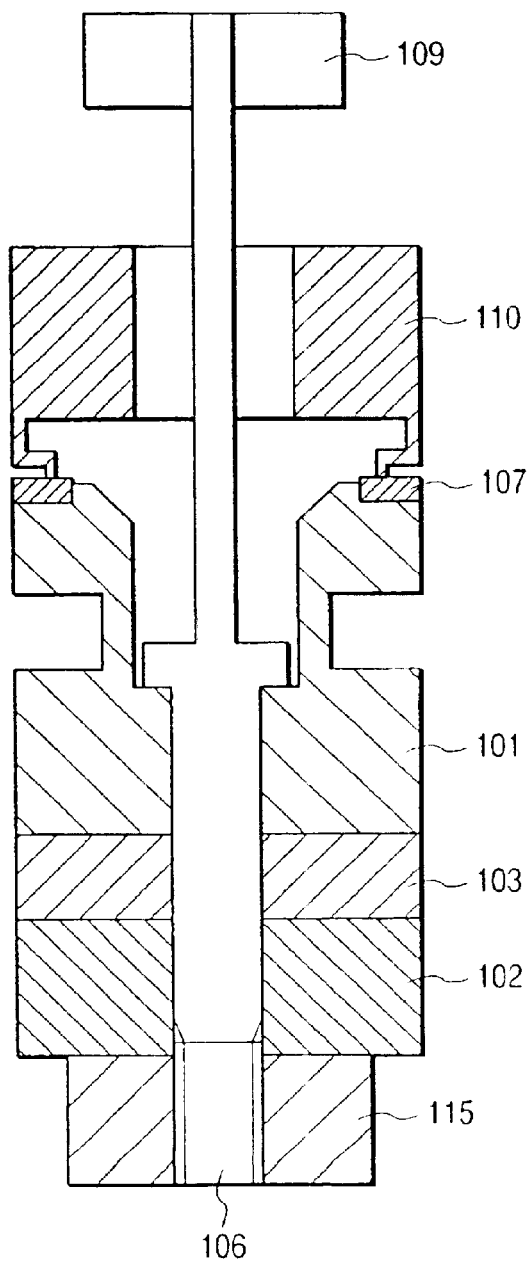
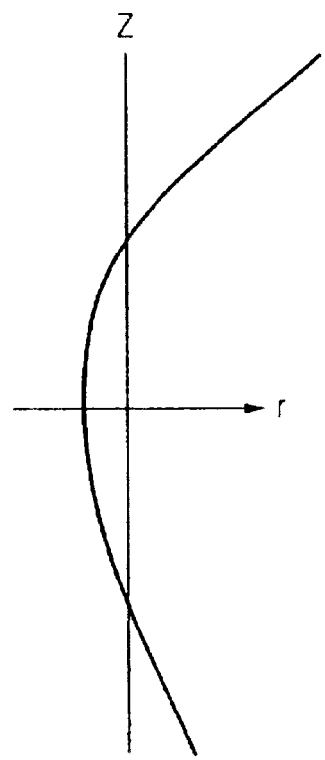

VIBRATION ELEMENT AND VIBRATION WAVE DRIVING APPARATUS

BACKGROUND OF THE INVENTION

1. Field of the Invention

The present invention relates to a vibration wave driving apparatus, and more particularly, to a configuration of a vibration element used in a bar-shaped vibration wave driving apparatus.

2. Related Background Art

A bar-shaped vibration wave driving apparatus includes, as a basic structure, a vibration element composed of elastic members made of metal or the like and a piezoelectric element as an electro-mechanical energy conversion element. The bar-shaped vibration wave driving apparatus generates a driving vibration, such as a travelling wave or the like, through application of an alternating voltage (an alternating signal), with different phases, to the piezoelectric element.

A contact member is brought into pressure contact with a frictional surface of the elastic member through a pressurizing means and the contact member is frictionally driven by the driving vibration generated in the frictional surface of the elastic member to allow the vibration element and the contact member to be moved relative to each other.

There is a vibration wave motor, as an example of such a vibration wave driving apparatus, in which a vibration element is used as a stator, and the contact member is a rotor.

Examples of the vibration element of such a vibration wave motor include those with a configuration in which a ring-shaped piezoelectric element plate is attached to one surface of a ring- or disc-shaped elastic member and those of a type in which the rotation of the rotor is taken out through an output shaft or of a type in which rotation of the rotor is taken out directly.

Such a vibration wave motor has been applied to products to be used for driving a camera lens and the like. There are annular type and bar-shaped type vibration wave motors.

FIG. 10A is a structural view of a vibration element of a bar-shaped vibration wave motor used for driving a camera lens. FIG. 10B shows a vibration mode (with the z-axis assigned to the axial direction and the r-axis assigned to the radial direction) in an axis part of the bar-shaped vibration element.

Reference numeral 101 indicates a first elastic member; 102, a second elastic member; and 103, a piezoelectric element. Reference numeral 106 denotes a shaft member passing through the first elastic member 101, the piezoelectric element 103, and the second elastic member 102. One end of the shaft member 106, located on the side of a rotor 110, is fixed to a fitting member 109 to be attached to a product, and the latter end is fixed to a nut 115. A threaded portion is formed in the other end of the shaft member 106. With the nut 115 tightened, the first elastic member 101, the piezoelectric element 103, and the second elastic member 102 disposed between a flange portion provided for the shaft member 106 and the nut 115 are sandwiched and fixed therebetween. Reference numeral 110 indicates the rotor, as described above, and reference numeral 107 denotes a friction member fixed to the first elastic element 101 to be in contact with the rotor.

When a driving signal is applied to the piezoelectric element 103, a bending vibration (e.g., FIG. 10B illustrates a primary bending vibration) is excited in the bar-shaped vibration element, whereby the bar-shaped vibration element makes a swing movement substantially about the z-axis. In this manner, the friction member 107 may be caused to make a circular motion around the z-axis.

It seems that the vibration element of such a bar-shaped vibration wave driving apparatus has been reduced in size in its radial direction, but there is still room for reduction in size in its thrust direction, i.e., in the length of its axis.

However, when the vibration element is simply shortened, there arise problems in that the resonance frequency increases and the vibration displacement is reduced, which causes a deterioration in the efficiency of friction drive, an increase in price of a driving circuit element due to the high frequency, and/or an increase in loss inside the element. Further, when the vibration element is simply made thinner to lower the resonance frequency, the diameters of a piezoelectric element and a frictional surface are also reduced, thus decreasing a generating force of the piezoelectric element and the friction torque. Therefore, it is conceivable that the output of the motor is made small.

As a technique for solving the above problems and shortening the axial length of a bar-shaped vibration wave driving apparatus, FIG. 11 illustrates one disclosed in Japanese Patent Application Laid-open No. 2001-145376.

A vibration apparatus in such document is identical to a conventional product in that a piezoelectric element 203 is sandwiched and fixed between a first elastic member 201 and a second elastic member 202. However, it is different from the conventional product in that the first elastic member 201 with a frictional surface is divided into an inner diameter portion and an outer diameter portion that are connected to each other through a thin connection part 210.

According to this construction, even if the axial length of the bar-shaped elastic member is shortened, a low resonance frequency can be obtained since the first vibration element has a sufficiently high mass.

According to this technique, however, when the connection part 210 is made thin to allow the resonance frequency to be lowered, its rigidity is deteriorated, and displacement generated in the piezoelectric element is absorbed by a soft spring of the connection part 210. Consequently, it is difficult to transmit the driving force to a rotor efficiently. Thus, it seems that there is still room for further improvement.

SUMMARY OF THE INVENTION

One aspect of this invention is to provide a vibration wave driving apparatus including an electro-mechanical energy conversion element that is sandwiched and fixed between elastic members, wherein a third elastic member is provided between the electro-mechanical energy conversion element and one of the elastic members. The third elastic member has a diameter larger than that of the electro-mechanical energy conversion element. When a driving vibration is applied to the electro-mechanical energy conversion element, a vibration element excites a bending vibration and this bending vibration allows an out-of-plane bending vibration to be excited in the third elastic member. Since a rotor is brought into contact with the third elastic member sandwiched between the elastic member and the electro-mechanical energy conversion element, the size of the vibration wave driving apparatus can be reduced. In addition, since a travelling wave produced by the bending vibrations of the vibration element and a travelling wave produced by the out-of-plane bending vibrations of the third elastic member are generated at the frictional surface of the vibration element, the output of the vibration wave driving apparatus can be improved.

BRIEF DESCRIPTION OF THE DRAWINGS

FIG. 10A is a cross-sectional view of a conventional bar-shaped vibration wave driving apparatus and FIG. 10B is a diagram illustrating a vibration mode of its vibration element.

DESCRIPTION OF THE PREFERRED EMBODIMENTS

First Embodiment

Figure 1:
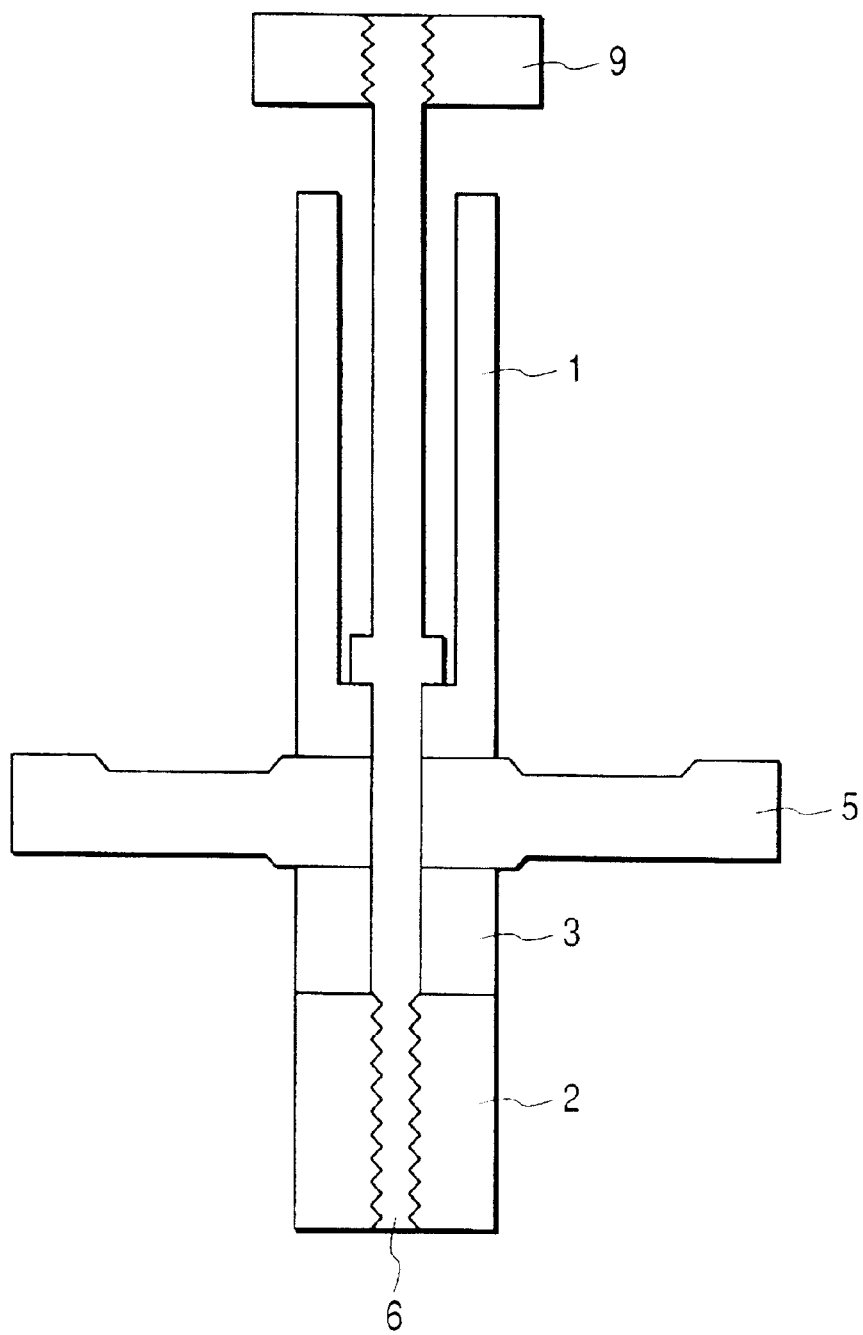
FIG. 1 is a cross-sectional view of a vibration element showing a first embodiment of the present invention.

The problem of the invention disclosed in Japanese Patent Application Laid-open No. 2001-145376 is caused because the mass member attached to an end of a soft spring (connection part 210) serves as a frictional surface. Hence, it is conceivable that this problem can be solved through separation of a functional member for lowering the resonance frequency and a functional member for taking out driving force from each other.

FIGS. 1A, 1B and 1C show a first embodiment of the present invention. Reference numeral 1 denotes a first elastic member formed in a cylindrical shape, which is made of a material whose vibration damping loss is small, such as brass. Reference numeral 5 denotes a flange-shaped (disk-shaped) elastic member, which is made of ceramic, such as alumina.

In FIG. 1, the vicinity of the outer periphery of the surface of the flange-shaped elastic member 5 located on a side opposite a piezoelectric element 3 is a portion that comes into contact with a rotor and is formed to be slightly thicker, like its center portion in which the flange-shaped elastic member 5 is supported and fixed by the first elastic member 1. This is intended to reduce the area to be subjected to lapping process by allowing the region between the center portion and the vicinity of the outer periphery to be recessed, and thereby to reduce processing time. In this case, as is apparent from FIG. 1, the vicinity of the outer periphery of the flange-shaped elastic member 5 extends outward beyond the outer peripheral portions of the first elastic member 1 and the piezoelectric element 3 that are adjacent to the flange-shaped elastic member 5.

Reference numeral 3 denotes a group of piezoelectric elements. The group of piezoelectric elements may be, e.g., a stacked type piezoelectric group that is formed with a plurality of elements each having electrodes both on its upper and lower sides, or a plurality of thin-film piezoelectric members having electrodes both on its upper and lower sides stacked and hardened by heating to form one body.

Reference numeral 2 indicates a second elastic member that also is formed of a material with a low vibration damping loss as in the case of the first elastic member 1.

The first elastic member 1, the second elastic member 2, the flange-shaped elastic member 5, and the piezoelectric element 3 are combined to form one body by means of a shaft member 6 as a fastening means. The shaft member 6, with a threaded portion formed on its one end, is inserted from the end portion of the first elastic member 1 so as to be passed through the piezoelectric element 3, and then the threaded portion is screwed together with an internal threaded portion formed in the axis center portion of the second elastic member 2. The flange-shaped elastic member 5 and the piezoelectric element 3 are disposed between the first elastic member 1 and the second elastic member 2 and, in this state, the whole can be sandwiched and fixed by a flange portion provided in the shaft member 6 in its middle portion and the threaded portion provided at an end portion of the shaft member 6. The other end portion of the shaft member 6 is fixed to a fitting member 9 and supports the whole bar-shaped vibration element. In the present embodiment, the vibration element is formed so that all its members except the flange-shaped elastic member 5 have the same outer diameter.

When a driving signal is applied to the piezoelectric element 3 from an unshown driving circuit, a primary bending vibration is excited in the bar-shaped vibration element thus formed and further a primary circumferential out-of-plane bending vibration including no circle to be a node of the vibration is excited in the flange-shaped elastic member 5.

At that time, the position of the anti-node of the primary bending vibration, which is displaced in a radial direction and is excited in the above-mentioned bar-shaped vibration element, is arranged in a position off the center surface of the flange-shaped elastic member 5. The "radial direction" as used herein denotes a direction included in a plane orthogonal to a straight line passing through the respective centers of the first elastic member 1, the flange-shaped elastic member 5, the piezoelectric element 3, and the second elastic member 2.

As the bending vibration generated in the bar, a higher-order vibration such as a second- or third-order vibration, also may be used without causing any problem. In such a case, however, it is necessary to dispose the flange-shaped elastic member 5 in a position off the position of the anti-node of such a vibration.

Next, the following description is directed to the driving principle of the present invention.

It has been known that when an out-of-plane bending vibration is excited in a disc and is allowed to travel, a circular or elliptical motion is produced at the surface of the disc.

Figure 2A:
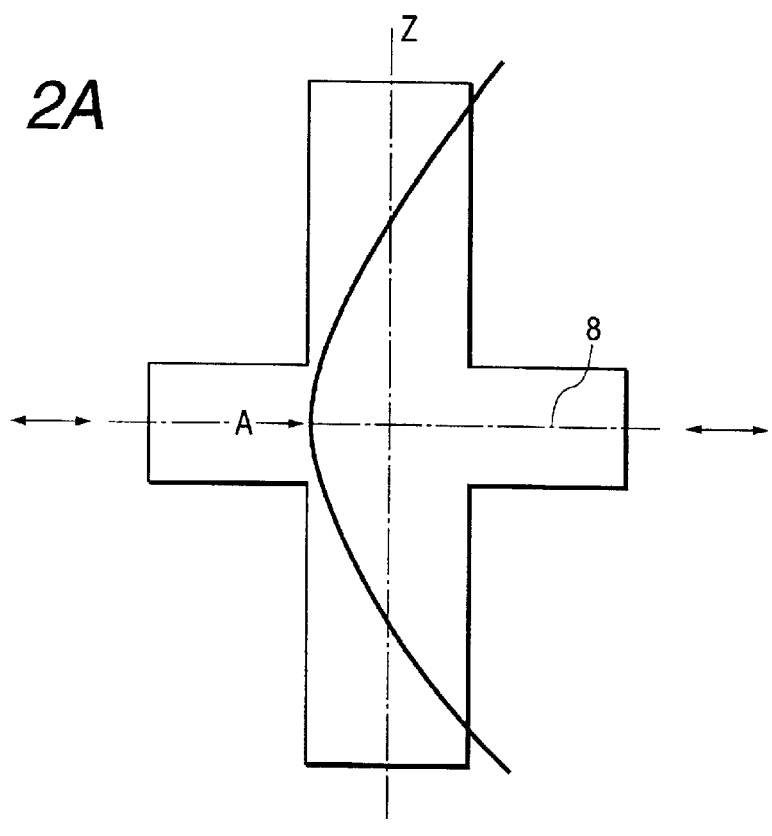
FIGS. 2A and 2B each are a vibration mode diagram used for explaining a driving principle of the present invention.

In this connection, a device having a vibration mode as shown in FIG. 2A is disclosed in Japanese Patent Application Laid-Open No. 4-91668 as one with a similar shape to that of the bar-shaped vibration element of the present embodiment. However, in the case of the configuration in which the center surface 8 of the flange-shaped elastic member coincides with the substantially center position A of the anti-node of a bending vibration of a bar as in the case of the mode shown in FIG. 2A, the flange-shaped elastic member makes only a translation motion in the radial direction by a primary bending vibration.

Figure 2B:
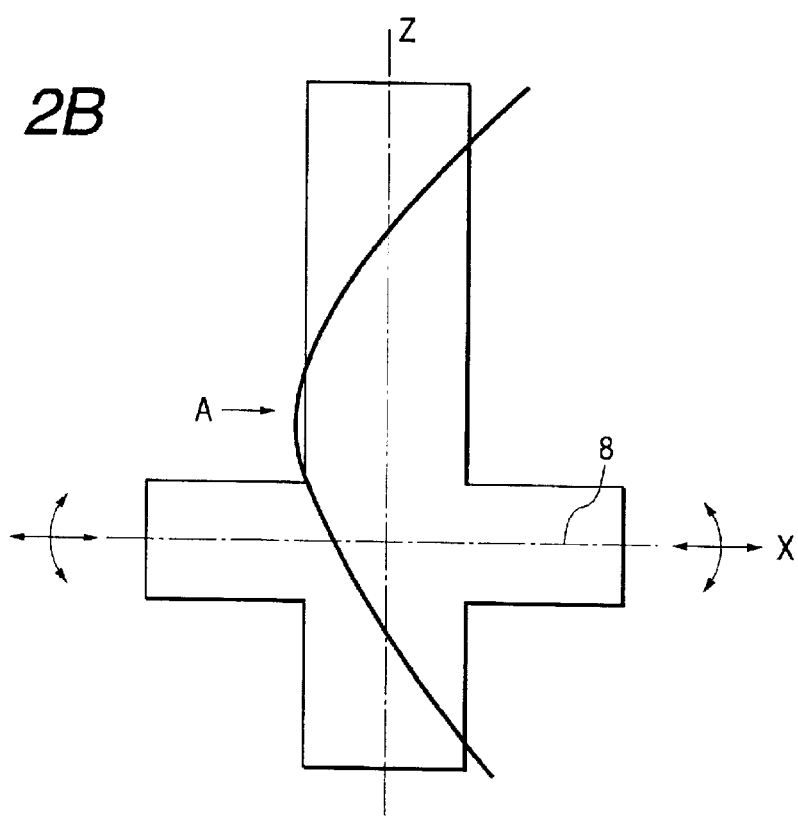

On the contrary, when the center surface 8 of the flange-shaped elastic member is in a position off the center position A of the anti-node of the bending vibration of the bar-shaped vibration element whose mode is shown in FIG. 2B showing the present embodiment, besides the translation motion in the radial direction, the flange-shaped elastic member can excite a rotational motion about an axis perpendicular to the axis of the bar-shaped vibration element (the axis orthogonal to the x-axis and z-axis in FIG. 2B). Hence, since the displacement including a thrust direction component and inertial force accompanying the displacement act on the vicinity of the outer periphery of the flange-shaped elastic member, the flange-shaped elastic member also can produce a vibration including the displacement component in the thrust direction, i.e. out-of-plane bending deformation. In addition, since the bending vibration excited in the bar-shaped vibration element rotates about the axis, the inertial force as a force for exciting the bending vibration acting on the flange-shaped elastic member travels on the periphery of the flange-shaped elastic member and the out-of-plane bending vibration of the flange-shaped elastic member also travels accordingly.

It is a well-known phenomenon that an elliptical motion is produced at the flange-shaped elastic member surface when a travelling out-of-plane bending vibration is generated in a flange-shaped object. Hence, when the rotation direction of this elliptical motion is allowed to coincide with the rotation direction of a circular or elliptical motion produced in the flange-shaped elastic member by rotation of the bending vibration of the bar-shaped vibration element, the rotational speed of a rotor pressed by the flange-shape elastic member is increased, whereby motor performance is improved.

When the flange-shaped elastic member is provided below the center position of the anti-node of a bending vibration acting on the flange-shaped elastic member, the location where the rotor and the vibration element are in contact with each other can be lowered, and thereby the size of the overall vibration wave driving apparatus can be reduced.

Figure 3A:
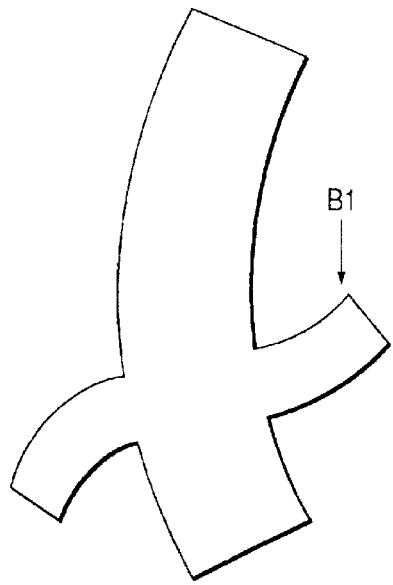
FIGS. 3A and 3B each are a diagram illustrating a vibration mode of a vibration element showing a driving principle of the present invention.
Figure 3B:
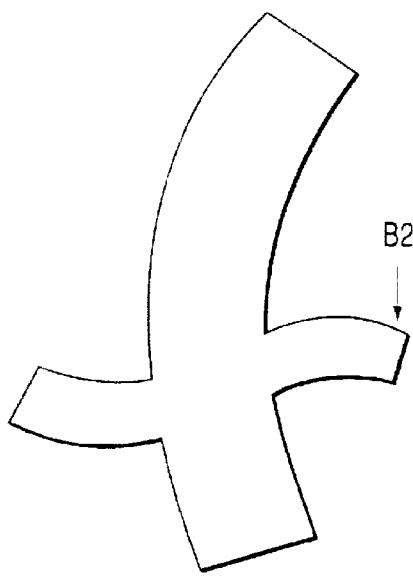
Figure 4A:
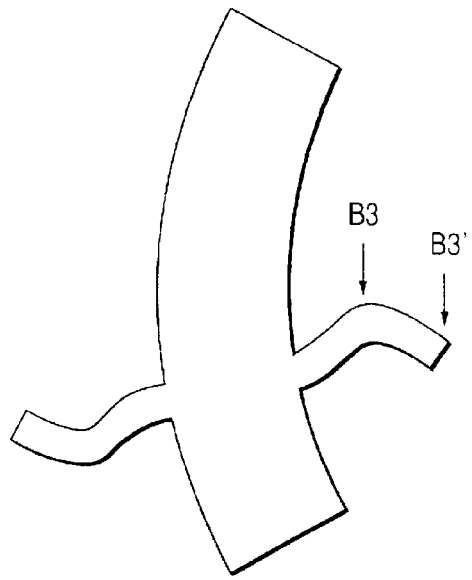
FIGS. 4A and 4B each are a diagram illustrating another vibration mode of a vibration element showing a driving principle of the present invention.
Figure 4B:
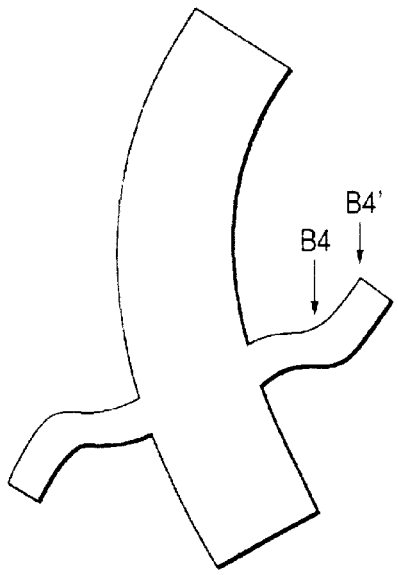

FIGS. 3A and 3B each show a vibration mode in which a bending vibration of the bar and a bending vibration of the flange-shaped elastic member including no circle to be a node of the vibration are coupled with each other. FIGS. 4A and 4B each show a vibration mode in which a bending vibration of the bar and a bending vibration of the flange-shaped elastic member including one circle to be a node are coupled with each other.

All the orders in the circumferential direction are 1 (1 wave).

With respect to the direction of the circular or elliptical motion produced by the bending travelling wave of the flange-shaped elastic member, the directions at points B1 and B2 are opposite each other in FIGS. 3A and 3B, the directions at points B3 and B4 are opposite each other in FIGS. 4A and 4B, and furthermore the directions at points B3 and B3' and the directions at points B4 and B4' each also are opposite to each other. The relationship between the points B3 and B3' and that between the points B4 and B4' each correspond to the relationship between the inside and outside of a node circle.

When driving the bar-shaped vibration element, the posture of vibrations largely depends on the relationship between the out-of-plane bending natural vibration frequency of the flange-shaped elastic member and the bending vibration frequency of the bar-shaped vibration element. Hence, the shape of the flange-shaped elastic member is determined so as to allow the generation of an out-of-plane bending vibration whose direction coincides with the rotation direction of the elliptical motion at the contact portion coming into contact with the rotor that is produced by the rotation of a bending vibration of the bar-shaped vibration element.

Second Embodiment

Figure 5:
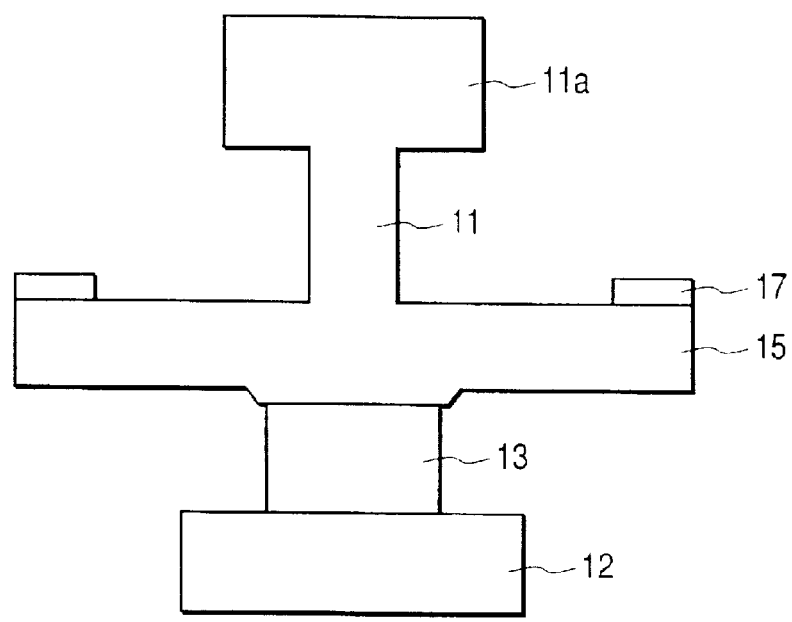
FIG. 5 is a cross-sectional view of a vibration element showing a second embodiment of the present invention.

FIG. 5 shows a second embodiment of the present invention.

In a vibration element of a vibration wave driving apparatus of the present invention, a flange-shaped elastic member 15 is formed integrally with a first elastic member 11, a piezoelectric element 13 is disposed between the flange-shaped elastic member 15 and a second elastic member 12, and the piezoelectric element 13 is sandwiched and fixed between the first elastic member 11 and the second elastic member 12 with an unshown fastening means. As the fastening means, for example, a screw member or the like may be used that is disposed inside the first and second elastic members 11 and 12 and passes through the piezoelectric element 13.

In the present embodiment, the vibration element is configured so that its upper and lower ends have increased outer diameters by means of a portion 11a provided for the first elastic member 11 and the second elastic member 12. This allows the natural vibration frequency of the vibration element as a whole to be reduced and thereby allows the vibration element to have a shortened axial length as compared to those whose natural vibration frequency is equal to that of this vibration element.

Furthermore, in the present embodiment, a member 17 having abrasion resistance is attached to a frictional portion subjected to friction with an unshown rotor on one surface of the outer peripheral portion of the flange-shaped elastic member 15, as a flange-shaped protruding portion. Since the frictional member 17 is so disposed, it is no longer necessary to carry out lapping process with respect to the flange-shaped elastic member.

Third Embodiment

Figure 6:
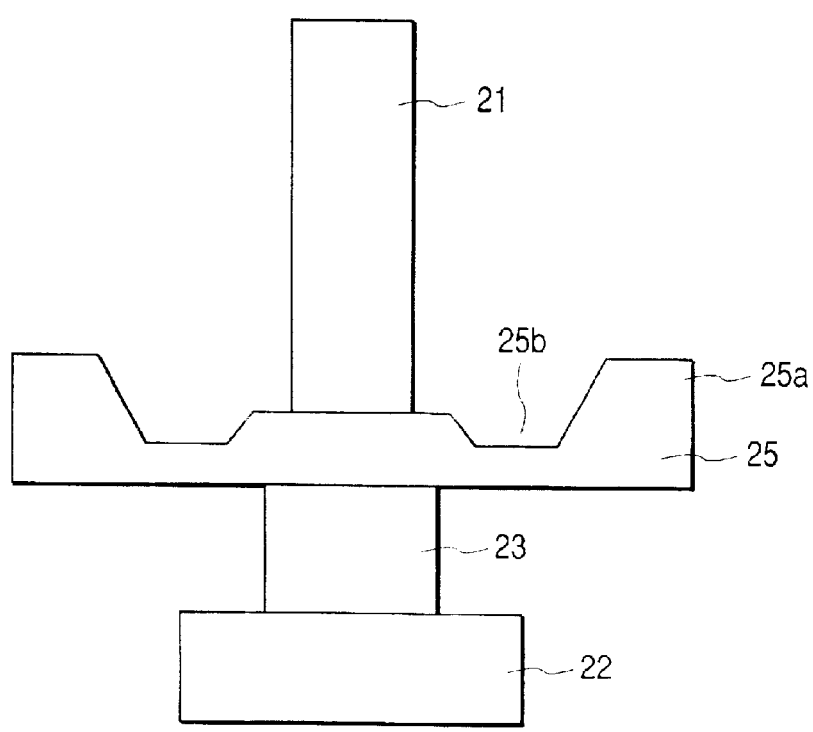
FIG. 6 is a cross-sectional view of a vibration element showing a third embodiment of the present invention.

FIG. 6 shows a third embodiment of the present invention.

A vibration element of the present embodiment includes a first elastic member 21, a second elastic member 22, a piezoelectric element 23, and a flange-shaped elastic member 25, as well as an unshown fastening means, as in the first embodiment. The present embodiment is different from the first embodiment in that a protrusion 25a is formed in the outer peripheral portion of the flange-shaped elastic member 25 and a circular groove 25b is provided on the inner peripheral side with respect to the protrusion 25a.

As a result, the flange-shaped elastic member 25 is configured to have an increased weight at its outer peripheral end portion and lower stiffness on its inner peripheral side. Thus, an out-of-plane displacement is augmented in the outer peripheral portion of the flange that comes into contact with a rotor, whereby the rotational speed of the rotor further increases.

Fourth Embodiment

Figure 7A:
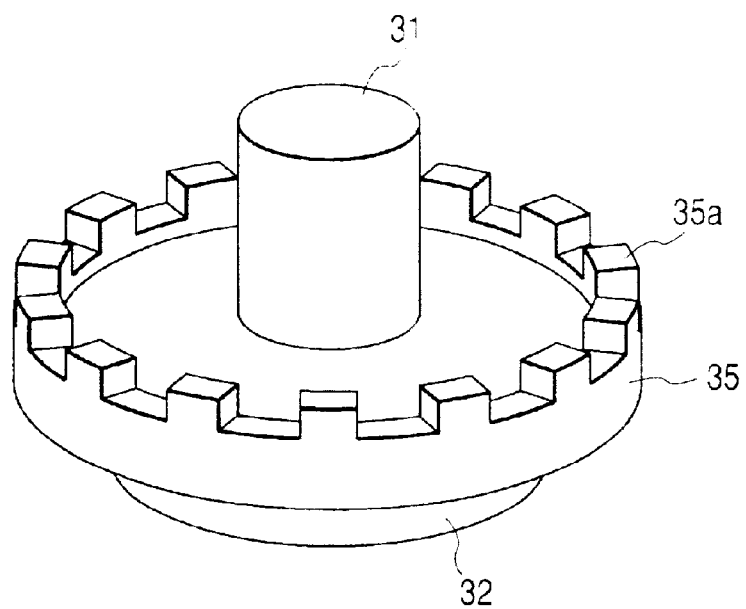
FIGS. 7A and 7B are a perspective view and a cross-sectional view, respectively, of a vibration element showing a fourth embodiment of the present invention.
Figure 7B:
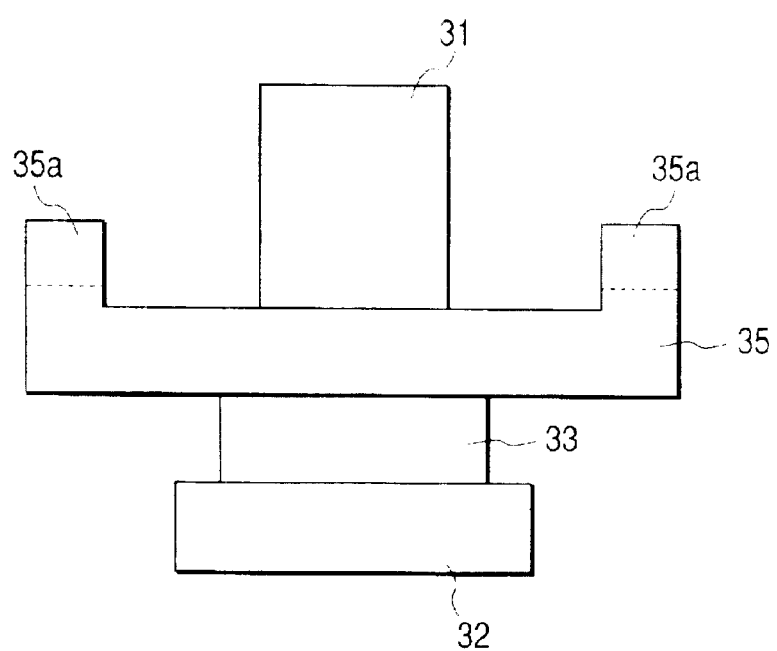

FIGS. 7A and 7B show a fourth embodiment of the present invention; FIG. 7A is a perspective view of a vibration element and FIG. 7B is a cross-sectional view thereof.

Similarly in the present embodiment, a flange-shaped elastic member 35 and a piezoelectric element 33 are sandwiched and fixed between a first elastic member 31 and a second elastic member 32. The present embodiment is different from those described above in that circumferential protrusions 35a are provided in the outer peripheral portion of the flange-shaped elastic member 35 and the protrusions 35a are separated from one another in the circumferential direction.

Consequently, the stiffness is not increased when the flange-shaped elastic member 35 is subjected to out-of-plane bending deformation. Hence, a considerable out-of-plane bending displacement is obtained.

In addition, since the circumferential displacement component of an elliptical motion produced by travel of the out-of-plane bending deformation of the flange-shaped elastic member 35 is increased, it is possible to increase the rotational speed of a rotor, i.e. motor output.

Fifth Embodiment

Figure 8:
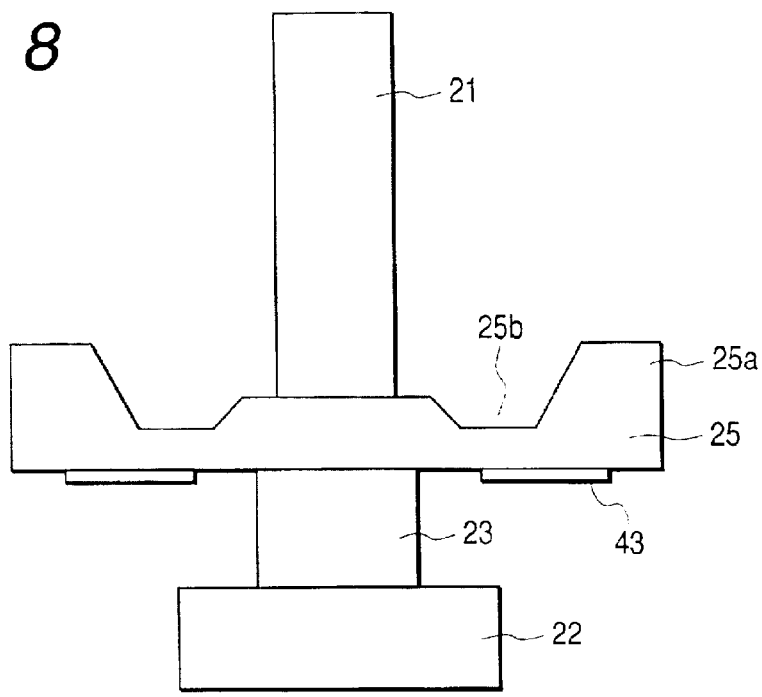
FIG. 8 is a cross-sectional view of a vibration element showing a fifth embodiment of the present invention.

FIG. 8 shows a vibration element according to a fifth embodiment of the present invention. This vibration element is obtained through further improvements made in the vibration element of the third embodiment.

A piezoelectric element 43 for exciting an out-of-plane bending vibration is attached to the bottom face of a flange-shaped elastic member 25.

When the inertial force alone is not sufficient to be used as the out-of-plane bending vibration exciting force, a displacement is augmented using stretching force in the circumferential direction of the piezoelectric element. As an alternating signal, one used for driving the bar-shaped vibration element may be shared or another one may be provided.

Sixth Embodiment

Figure 9:
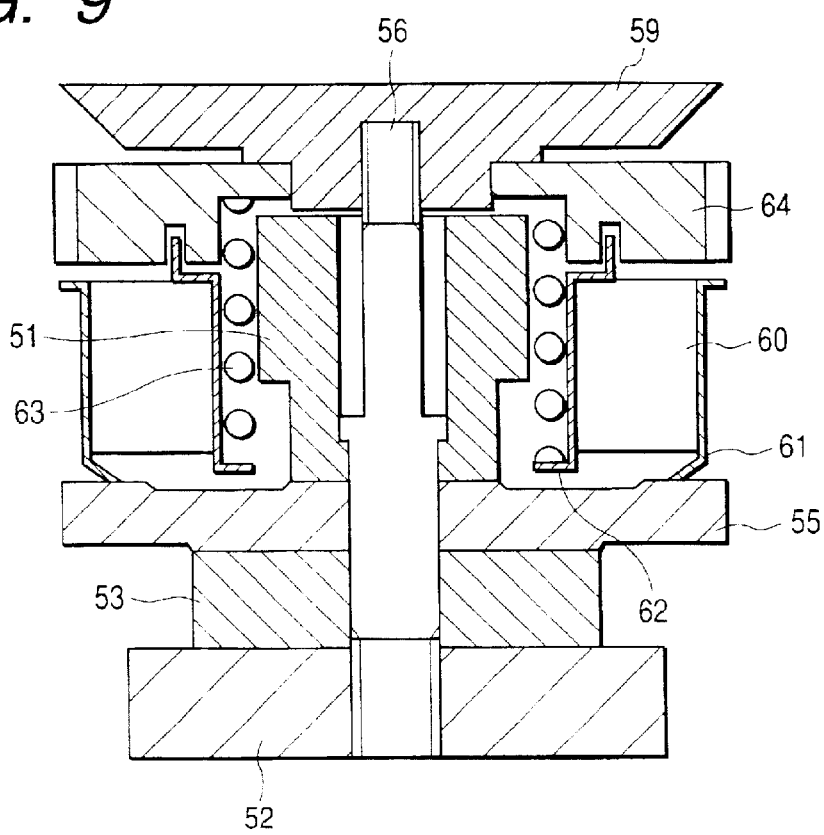
FIG. 9 is a structural view of a vibration wave driving apparatus showing a sixth embodiment of the present invention.
Figure 11:
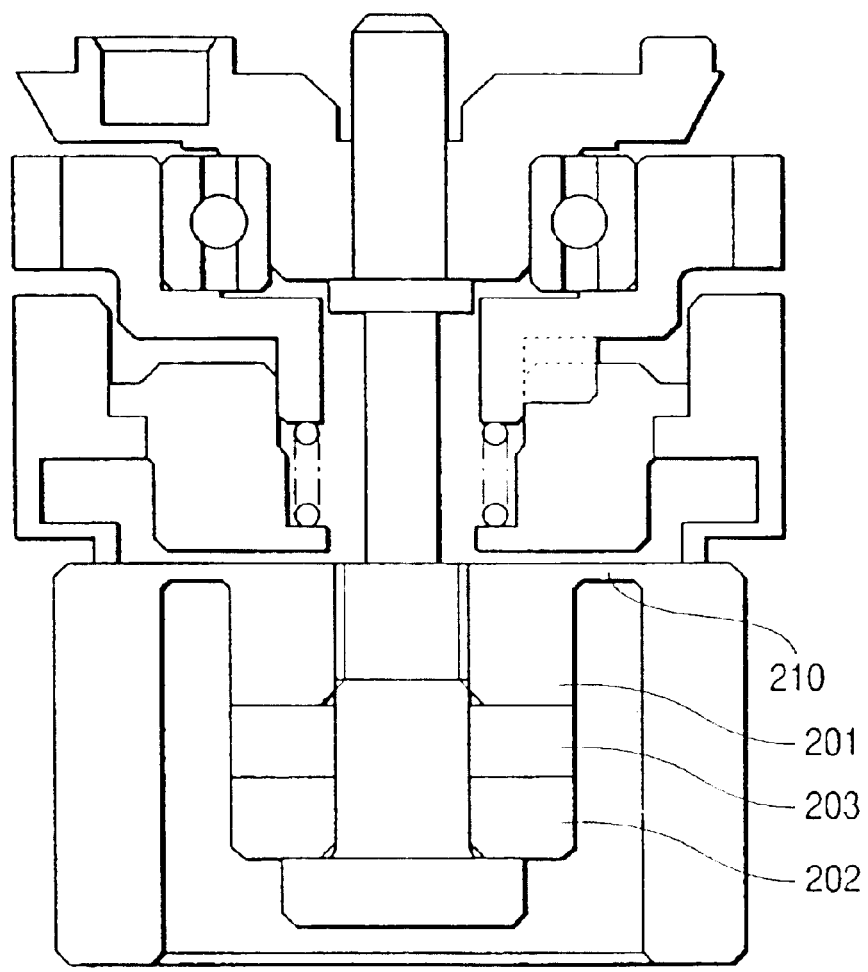
FIG. 11 is a cross-sectional view of a conventional vibration wave driving apparatus with a shortened axial length.

FIG. 9 is a structural view of a bar-shaped vibration wave driving apparatus with the vibration element of the second embodiment.

As shown in FIG. 9, in the bar-shaped vibration element of the present embodiment, a first elastic member 51, a second elastic member 52, a piezoelectric element 53, and a flange-shaped elastic member 55 are fastened together with a vibration element holding bolt/supporting pin 56 as a fastening member. In addition, a fitting flange 59 to be fitted into a product is screwed and joined with a portion of the pin 56 located on position opposite the second elastic member 52. An output gear 64 is attached to the fitting flange 59 so as to be rotatable about the center of the axis of the vibration element. A rotor 60 is disposed around the first elastic member 51. The rotor 60 is provided with a contact spring 61, formed by press-forming, that is adhesively secured thereto on its outer peripheral side, and a spring case 62 that is engaged and joined therewith an on inner peripheral side of the rotor 60. The spring case 62 is regulated by and fixed to the output gear 64 by its upper end portion so as not to be displaced relative to the output gear 64 in the radial direction. A spring 63 for applying pressing force is disposed between the lower end of the spring case 62 and the output gear 64. By the spring force of this spring 63, the spring end of the contact spring 61 fixed to the outer peripheral portion of the rotor 60 is in pressure contact with the upper surface of the flange-shaped elastic member 55. The fitting flange 59 also has a function of providing additional mass for preventing vibrations from leaking to the external environment from the vibration element holding bolt/supporting pin 56.

In the present embodiment, the vibration element is fixed, and the rotor, as a contact member that is brought into pressure contact with the vibration element, is movable. However, the present invention is not limited to this. The contact member may be fixed and the vibration element may be movable, and the vibration element and the contact member may be frictionally driven relative to each other by the driving vibration generated in the flange-shaped elastic member protruding in a flange form of the vibration element.

Similarly, in the second to sixth embodiments, it is to be understood that the center surface of the flange-shaped elastic member is arranged in a position that does not coincide with the position of the anti-node of a bending vibration of the bar-shaped vibration element, although it is not shown in the figures.

As described above, the embodiment described above employs a configuration in which a flange-shaped elastic member with a frictional surface is provided for a bar-shaped vibration element and driving force is derived through the frictional surface, as well as a configuration in which an elastic member protruding from the flange-shaped elastic member portion is provided and the resonance frequency is lowered with this spring-mass system. Hence, the spring can be made considerably soft so that the resonance frequency is decreased to a sufficiently low level, i.e. the resonance frequency can be decreased to a sufficiently low level even when the diameter of the elastic member is reduced considerably.

Furthermore, when the protruding elastic member portion is formed of metal, even in the case where distortion is concentrated thereon, the increase in internal loss stays within a minimum range since the damping characteristic of the metallic material is better than that of the piezoelectric element, and thus a short vibration element with high efficiency can be obtained.

In addition, to the driving force generated by a first travelling wave produced around the axis of the bar-shaped vibration element can be added a driving force generated by a second travelling wave excited in the flange-shaped elastic member. Hence, a sufficiently great driving force can be obtained through mere application of a smaller driving signal than a conventional one to an electro-mechanical energy conversion element.

Moreover, since the rotor can be disposed around the protruding elastic member, the overall length of the motor also may be reduced.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A vibration wave driving apparatus, comprising:
   a vibration element including a first elastic member, a second elastic member, a third elastic member and an electro-mechanical energy conversion element, said third elastic member and said electro-mechanical energy conversion element being disposed between said first elastic member and said second elastic member; and
   a rotor that is brought into contact with a frictional surface of said third elastic member,
   wherein when a driving signal is applied to said electro-mechanical energy conversion element, said vibration element excites a first traveling wave at the frictional surface by generating bending vibration which are displayed in a direction orthogonal to an axial direction of said vibration element and a second traveling wave at the frictional surface by generating bending vibrations of said third elastic member, and a circular or an elliptical movement is produced at the frictional surface by a vibration wave as a composite of the first traveling wave and the second traveling wave.

2. A vibration element according to claim 1, wherein the driving signal applied to said electro-mechanical energy conversion element is used for exciting the bending vibrations which are displaced in a direction orthogonal to the axial direction of said vibration element.

3. A vibration wave driving apparatus according to claim 1, wherein a center portion in the axial direction of said third elastic member does not coincide with a center of an anti-node of the bending vibrations which are displaced in a direction orthogonal to the axial direction of said vibration element.

4. A vibration wave driving apparatus according to claim 1, wherein at least one end portion of said vibration element has an increased diameter.

5. A vibration wave driving apparatus according to claim 1, wherein said third elastic member includes a thinner portion than a portion at which the frictional surface is located, on an inner peripheral side with respect to the frictional surface.

6. A vibration wave driving apparatus according to claim 1, wherein said vibration element further includes another electro-mechanical energy conversion element that is fixed to said third elastic member.

7. A vibration wave driving apparatus, comprising:
a vibration element including a first elastic member, a second elastic member, a third elastic member and an electro-mechanical energy conversion element, said third elastic member and said electro-mechanical energy conversion element being disposed between said first elastic member and said second elastic member, and said third elastic member having a frictional surface and an outer diameter larger than that of said the electro-mechanical energy conversion element; and
a rotor that is brought into contact with the frictional surface of said vibration element,
wherein said vibration element excites bending vibrations which are displaced in a direction orthogonal to an axial direction of said first elastic member and said second elastic member through application of a driving signal to said electro-mechanical energy conversion element, and
a center of an anti-node of the bending vibration does not coincide with a center portion of said third elastic member in an axial direction of said vibration element.

8. A vibration wave driving apparatus according to claim 7, wherein at least one end portion of said vibration element has an increased diameter.

9. A vibration wave driving apparatus according to claim 7, wherein said third elastic member includes a thinner portion than a portion at which the frictional surface is located, on an inner peripheral side with respect to the frictional surface.

10. A vibration wave driving apparatus according to claim 7, wherein said vibration element further includes another electro-mechanical energy conversion element that is fixed to said third elastic member.

11. A vibration wave driving apparatus, comprising:
a vibration element including a first elastic member, a second elastic member, a third elastic member and an electro-mechanical energy conversion element, said third elastic member and said electro-mechanical energy conversion element being disposed between said first elastic member and said second elastic member; and a rotor that is brought into contact with a frictional surface of said third elastic member,
wherein said vibration element excites a bending vibration in a plane orthogonal to an axial direction of said vibration element in said third elastic member by generating bending vibrations which are displaced in a direction orthogonal to the axial direction.

12. A vibration wave driving apparatus according to claim 11, wherein a center portion in the axial direction of said third elastic member does not coincide with a center of an anti-node of the bending vibrations which are displaced in a direction orthogonal to the axial direction of said vibration element.

13. A vibration wave driving apparatus according to claim 11, wherein at least one end portion of said vibration element has an increased diameter.

14. A vibration wave driving apparatus according to claim 11, wherein said third elastic member includes a thinner portion than a portion at which the frictional surface is located, on an inner peripheral side with respect to the frictional surface.

15. A vibration wave driving apparatus according to claim 11, wherein said vibration element further includes another electro-mechanical energy conversion element that is fixed to said third elastic member.

16. A vibration wave driving apparatus, comprising:
a vibration element including a first elastic member, a second elastic member and an electro-mechanical energy conversion element which is disposed between said first elastic member and said second elastic member; and
a rotor that is brought into contact with a frictional surface of said first elastic member,
wherein said first elastic member has a first portion provided with said frictional surface, and a second portion having a diameter which is smaller than that of the first portion and which is located within said rotor, and
when a driving signal is applied to the electro-mechanical energy conversion element, said vibration element excites a first traveling wave at the frictional surface by generating bending vibrations which are displaced in a direction orthogonal to an axial direction of said vibration element and a second traveling wave at the frictional surface by generating bending vibrations in said third elastic member, and a circular or an elliptical movement is produced at the frictional surface by a vibration wave as a composite of the first traveling wave and the second traveling wave.

17. A vibration wave driving apparatus according to claim 16, wherein a center portion in the axial direction of said first portion does not coincide with a center of an anti-node of the bending vibrations which are displaced in a direction orthogonal to the axial direction of said vibration element.

18. A vibration wave driving apparatus according to claim 16, wherein said first portion of said first elastic member includes a thinner portion than a portion at which the frictional surface is located, on an inner peripheral side with respect to the frictional surface.

19. A vibration wave driving apparatus, comprising:
a vibration element including a first elastic member, a second elastic member and an electro-mechanical energy conversion element which is disposed between said first elastic member and said second elastic member; and
a rotor that is brought into contact with the frictional surface of said first elastic member, wherein said first elastic member has a first portion provided with said frictional surface, and a second portion having a diameter which is smaller than that of said first portion and which is located within said rotor, the vibration element excites bending vibrations which are displaced in a direction orthogonal to an axial direction of said vibration element through application of a driving signal to said electro-mechanical energy conversion element, and a center of an anti-node of the bending vibration does not coincide with a center portion of said first portion in an axial direction of said vibration element.

20. A vibration wave driving apparatus according to claim 19, wherein said first portion of said first elastic member includes a thinner portion than a portion at which the frictional surface is located, on an inner peripheral side with respect to the frictional surface.

21. A vibration wave driving apparatus, comprising:

a vibration element including a first elastic member, a second elastic member and an electro-mechanical energy conversion element which is disposed between said first elastic member and said second elastic member; and a rotor that is brought into contact with a frictional surface of said first elastic member;

wherein said first elastic member has a first portion provided with said frictional surface, and a second portion having a diameter which is smaller than that of the first portion and which is located within said rotor, and the vibration element excites a bending vibration in a plane orthogonal to an axial direction of said vibration element in said third elastic member by generating bending vibrations which are displaced in a direction orthogonal to the axial direction.

22. A vibration wave driving apparatus according to claim 21, wherein a center portion in the axial direction of said first portion does not coincide with a center of an anti-node of the bending vibrations which are displaced in a direction orthogonal to the axial direction of said vibration element.

23. A vibration wave driving apparatus according to claim 21, wherein said first portion of said first elastic member includes a thinner portion than a portion at which the frictional surface is located, on an inner peripheral side with respect to the frictional surface.

* * * * *

UNITED STATES PATENT AND TRADEMARK OFFICE
CERTIFICATE OF CORRECTION

PATENT NO. : 6,781,283 B2
DATED : August 24, 2004
INVENTOR(S) : Takayuki Tsukimoto It is certified that error appears in the above-identified patent and that said Letters Patent is hereby corrected as shown below:

Column 3,
Lines 6 and 10, "each are a diagram" should read -- are diagrams --.

Column 7,
Line 48, "an on" should read -- on an --.

Signed and Sealed this

Seventh Day of December, 2004

JON W. DUDAS
*Director of the United States Patent and Trademark Office*